(12) United States Patent
Bok et al.

(10) Patent No.: US 11,572,034 B2
(45) Date of Patent: Feb. 7, 2023

(54) WIRELESS SEATBELT REMINDER DEVICE

(71) Applicants: Hyundai Motor Company, Seoul (KR); Kia Motors Corporation, Seoul (KR)

(72) Inventors: Chang Kyu Bok, Seoul (KR); Hyun Kyu Moon, Gyeonggi-do (KR); Young Rok Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 95 days.

(21) Appl. No.: 17/181,165

(22) Filed: Feb. 22, 2021

(65) Prior Publication Data

US 2022/0097649 A1    Mar. 31, 2022

(30) Foreign Application Priority Data

Sep. 29, 2020   (KR) .......................... 10-2020-0126888

(51) Int. Cl.
   *B60R 22/48*   (2006.01)
   *B60R 16/023*  (2006.01)

(52) U.S. Cl.
   CPC ............ *B60R 22/48* (2013.01); *B60R 16/023* (2013.01); *B60R 2022/4816* (2013.01)

(58) Field of Classification Search
   None
   See application file for complete search history.

(56) References Cited

U.S. PATENT DOCUMENTS

| | | | |
|---|---|---|---|
| 2012/0143438 A1* | 6/2012 | Heiden | H04B 10/2755 701/1 |
| 2014/0200755 A1* | 7/2014 | Sisk | B60L 50/15 701/22 |
| 2018/0162447 A1* | 6/2018 | Fees | B62D 21/155 |
| 2021/0114477 A1* | 4/2021 | Montousse | B60N 2/646 |

FOREIGN PATENT DOCUMENTS

| | | |
|---|---|---|
| JP | 2004-0034764 A | 2/2004 |
| JP | 2008-0260452 A | 10/2008 |
| JP | 2019-0069725 A | 5/2019 |
| KR | 10-2020-0082263 A | 7/2020 |

* cited by examiner

*Primary Examiner* — Brent Swarthout (74) *Attorney, Agent, or Firm* — Fox Rothschild LLP; Peter F. Corless (57) ABSTRACT

A technology is provided that secures the straightness of an electromagnetic wave signal transmitted and received according to the fastening of a buckle. A wireless seatbelt reminder device includes a tunnel member that is disposed in parallel to a seat rail, and has a passage formed therein. A sub-transmission and reception unit transmits an electromagnetic wave signal in the longitudinal direction of the passage as a seatbelt is fastened to a buckle and a main transmission and reception unit receives the electromagnetic wave signal transmitted by the sub-transmission and reception unit inside the passage to transfer the electromagnetic wave signal to an integrated controller.

11 Claims, 9 Drawing Sheets

WIRELESS SEATBELT REMINDER DEVICE

CROSS REFERENCE TO RELATED APPLICATION

The present application claims priority of Korean Patent Application No. 10-2020-0126888 filed on Sep. 29, 2020, the entire contents of which is incorporated herein for all purposes by this reference.

BACKGROUND

Field of the Disclosure

The present disclosure relates to a wireless seatbelt reminder device which secures the straightness of an electromagnetic wave signal transmitted and received according to the fastening of a buckle, thereby improving transmission and reception performance of a buckle fastening signal.

Description of the Related Art

A seatbelt reminder is a device that alerts a passenger of the non-wearing state of the seatbelt with a warning sound or a waning light if the passenger sitting on a seat is not wearing a seatbelt when a vehicle is being driven at a predetermined speed or more to induce the wearing of the seatbelt. The seatbelt reminder includes a buckle and an integrated central control unit (ICU) electrically connected via a wiring to transfer a buckle fastening signal to the ICU when the seatbelt is fastened to the buckle, and the ICU is connected to a vehicle controller by the communication to output an alert indicating whether the corresponding seatbelt is fastened.

Meanwhile, in recent years, a seatbelt reminder device for wirelessly transmitting a signal indicating that the seatbelt is fastened to the buckle to the vehicle controller has been developed. However, the device for wirelessly detecting whether the seatbelt is worn has the reduced reception rate of the seatbelt fastening signal transmitted to the vehicle controller due to a location of a seat, other obstacles, or the like.

The foregoing explained as the background is intended merely to aid in the understanding of the background of the present disclosure, and is not intended to mean that the present disclosure falls within the purview of the related art that is already known to those skilled in the art.

SUMMARY

The present disclosure provides a wireless seatbelt reminder device, which secures the straightness of an electromagnetic wave signal transmitted and received according to the fastening of a buckle, thereby improving transmission and reception performance of a buckle fastening signal.

A configuration of the present disclosure for achieving the object may include: a tunnel member disposed in parallel to a seat mil, and having a passage formed therein; a sub transmission and reception unit configured to transmit an electromagnetic wave signal in the longitudinal direction of the passage as a seatbelt is fastened to a buckle; and a main transmission and reception unit configured to receive the electromagnetic wave signal transmitted by the sub-transmission and reception unit inside the passage to transfer the electromagnetic wave signal to an integrated controller.

The sub-transmission and reception unit may include: a sub-controller connected to the buckle, and configured to receive a signal indicating that the seatbelt is fastened to the buckle; and a sub-sensor module provided inside the tunnel member, and configured to transmit the electromagnetic wave signal to the main transmission and reception unit by receiving the signal transmitted by the sub-controller.

The main transmission and reception unit may include: a main sensor module provided inside the tunnel member, and configured to receive the electromagnetic wave signal transmitted by the sub-transmission and reception unit; and a main controller configured to receive the signal transmitted by the main sensor module to transfer the signal to the integrated controller. The tunnel member may have an inner passage formed in a darkroom structure.

A through slot may be formed in the end of the tunnel member in the longitudinal direction; the connecting portion between the sub-controller and the sub-sensor module may penetrate the through slot, and the sub-sensor module may be disposed inside the tunnel member; and a darkroom formation member made of a flexible material in a shape covering the through slot may be coupled.

The darkroom formation member may include a rubber or a brush having a shape of a thin rubber plate and coupled to the inner surface of the through slot. The tunnel member may be provided separately on the side surface of the seat rail. The tunnel member may be fixed to a vehicle body on the side of the seat rail; a first end of a module fixing bracket may be coupled to a movable rail configuring the seat rail; a middle end of the module fixing bracket may penetrate the through slot and a second end thereof (e.g., opposite to the first end) may be coupled to the sub-sensor module; a guide slot may be formed on the inner surface of the tunnel member connected to the through slot in the longitudinal direction; and a guider may be fixed to the middle end of the module fixing bracket, and the guider may be slid along the guide slot. The inner surface of the tunnel member may be formed in a relatively bright white-series color. A painting layer may be formed on the inner surface of the tunnel member. A reflector may be formed on the inner surface of the tunnel member.

Through the above configuration, the present disclosure transmits the electromagnetic wave signal from the sub-transmission and reception unit in the longitudinal direction of the passage inside the tunnel member, and allows the main transmission and reception unit to sense the electromagnetic wave signal inside the tunnel member, when the seatbelt is fastened to the buckle, thereby securing the straightness of the electromagnetic wave signal regardless of the location of the seat, other obstacles, or the like. Therefore, it may be possible to improve the wireless transmission and reception performance of the electromagnetic wave signal according to the fastening of the buckle, thereby more accurately sensing the presence and absence of the wearing of the seatbelt.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

A preferred exemplary embodiment of the present disclosure will be described in detail with reference to the accompanying drawings as follows.

Figure 1:
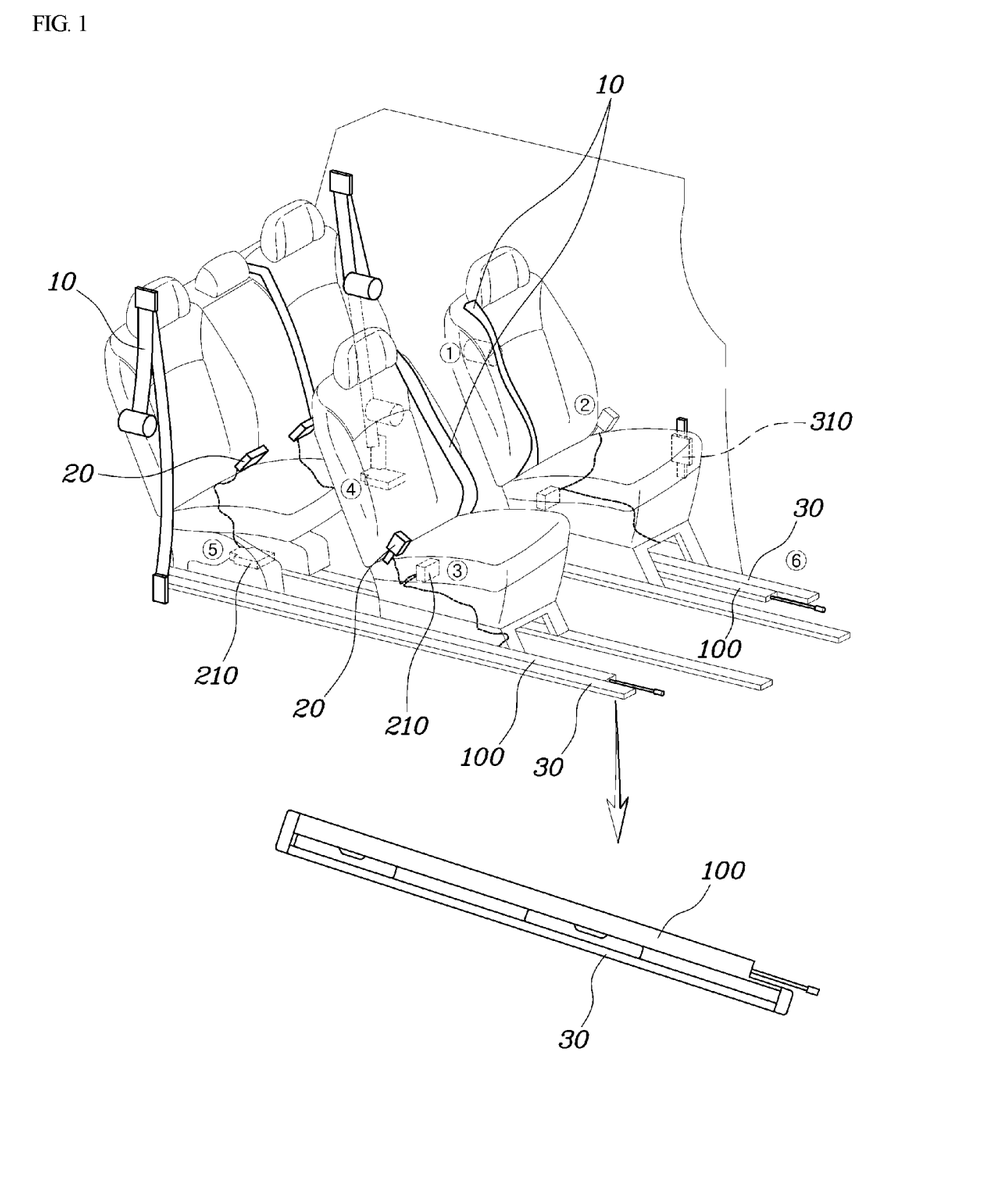
FIG. 1 is a diagram illustrating an inner configuration of a vehicle adopting a wireless seatbelt reminder device according to the present disclosure, and the enlargement of a seat rail and a tunnel member.
Figure 2:
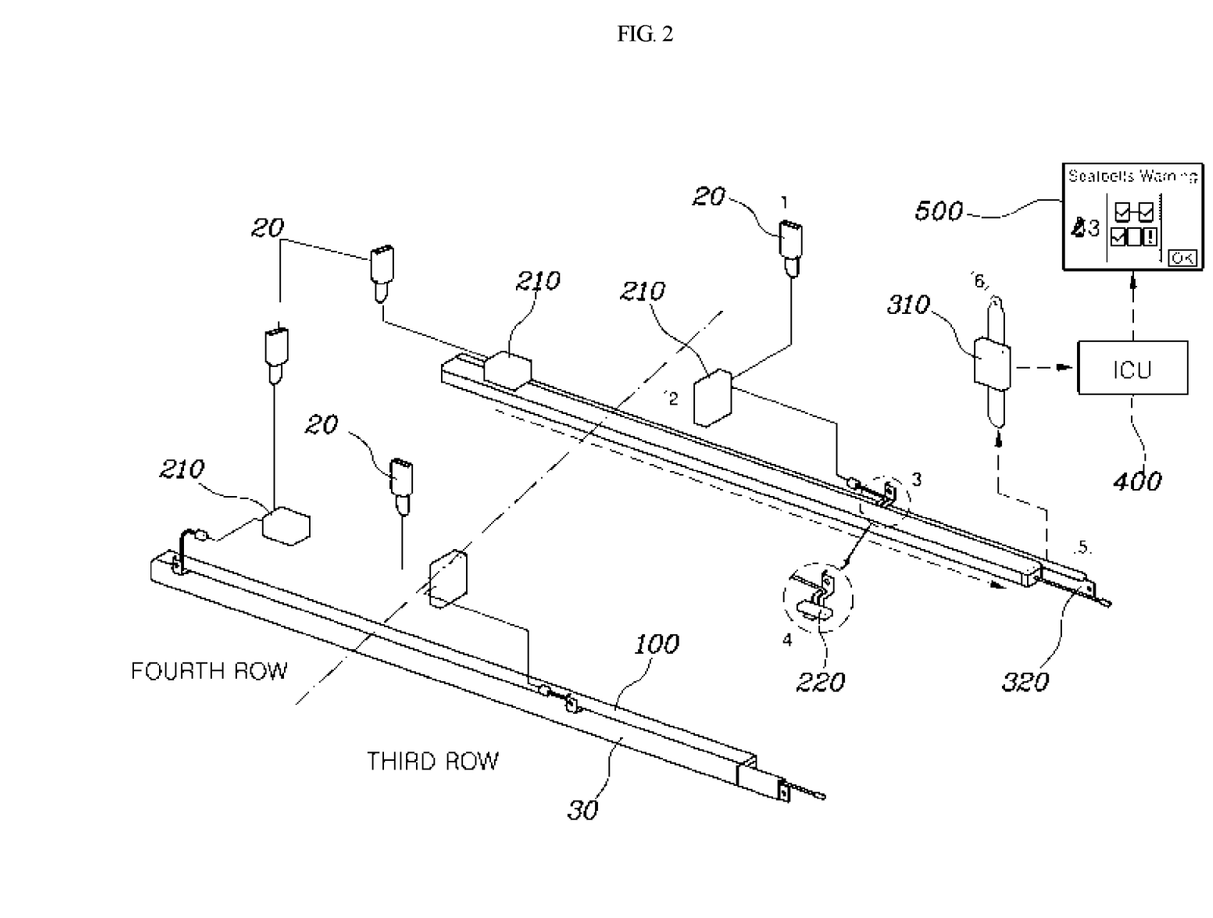
FIG. 2 is a diagram illustrating a system configuration for transferring a seatbelt fastening signal to an integrated controller according to the present disclosure.

FIG. 1 is a diagram illustrating an inner configuration of a vehicle adopting a wireless seatbelt reminder device according to the present disclosure, and the enlargement of a seat rail 30 and a tunnel member 100, and FIG. 2 is a diagram illustrating a system configuration for transferring a seatbelt 10 fastening signal to an integrated controller 400 according to the present disclosure.

Referring to FIGS. 1 and 2, the present disclosure may include the tunnel member 100 disposed in parallel to the seat rail 30, and having a passage formed herein; a sub-transmission and reception unit 200 configured to transmit an electromagnetic wave signal inside the passage in response to the seatbelt 10 being fastened to a buckle 20; and a main transmission and reception unit 300 configured to receive the electromagnetic wave signal transmitted from the sub transmission and reception unit 200 inside the passage to transfer the electromagnetic wave signal to the integrated controller 400.

For example, the wireless seatbelt reminder device according to the present disclosure may be applied to third row and fourth row seats of an RV vehicle, and the seat mil 30 may be installed in the front and rear direction of the vehicle and the seat may slide back and forth along the seat rail 30. For reference, the seat mil 30 is configured such that a movable rail 32 coupled to the bottom of the seat is slidably fitted into a fixed rail 34 fixed to the bottom of a vehicle body.

Further, the side of the seat rail 30 may be installed with the tunnel member 100 in the front and rear longitudinal direction of the vehicle, and a passage may be formed lengthwise inside the tunnel member 100 in the longitudinal direction. Each seat may be installed individually with the buckle 20 to which the seatbelt 10 is fastened, and if the buckle 20 is electrically connected to the sub transmission and reception unit 200 and the seatbelt 10 is fastened to the buckle 20, a seatbelt 10 fastening signal may be transferred to the sub transmission and reception unit 200. Further, when the seatbelt 10 fastening signal is transferred to the sub-transmission and reception unit 200, the sub-transmission and reception unit 200 may be configured to transmit the electromagnetic wave signal. Particularly, the electromagnetic wave signal transmitted by the sub-transmission and reception unit 200 may be transmitted toward the main transmission and reception unit 300 along the passage inside the tunnel, and the electromagnetic wave signal transmitted by the sub-transmission and reception unit 200 may be received in the main transmission and reception unit 300 inside the tunnel.

Additionally, the main transmission and reception unit 300 and the integrated controller 400 may be electrically connected, and thus, when the electromagnetic wave signal is received in the main transmission and reception unit 300, the main transmission and reception unit 300 may transfer the fastening signal to the integrated controller 400, and further, the integrated controller 400 may be configured to output a wanting to a cluster 500 or the like indicating the fastening state of the seatbelt 10. In particular, the integrated controller 400 may be an integrated central control unit (ICU). Further, an infrared signal may be used as the electromagnetic wave signal, but all types of electromagnetic wave signals capable of using the wavelength of light such as ultraviolet light, visible light, or microwave other than the infrared signal may be used.

In other words, when the seatbelt 10 is fastened to the buckle 20, the electromagnetic wave signal may be transmitted by the sub-transmission and reception unit 200 in the longitudinal direction of the passage inside the tunnel member 100, and the main transmission and reception unit 300 may be configured to sense the electromagnetic wave signal inside the tunnel member 100, thereby securing the straightness (e.g., linear direction) of the electromagnetic wave signal regardless of the location of the seat, other obstacles, or the like.

Therefore, by improving the wireless transmission and reception performance of the electromagnetic wave signal according to the fastening of the buckle 20, it may be possible to more accurately sense whether the seatbelt 10 is won), thereby improving the merchantability of the product. Further, the sub-transmission and reception unit 200 may include a sub-controller 210 and a sub-sensor module 220.

Figure 3:
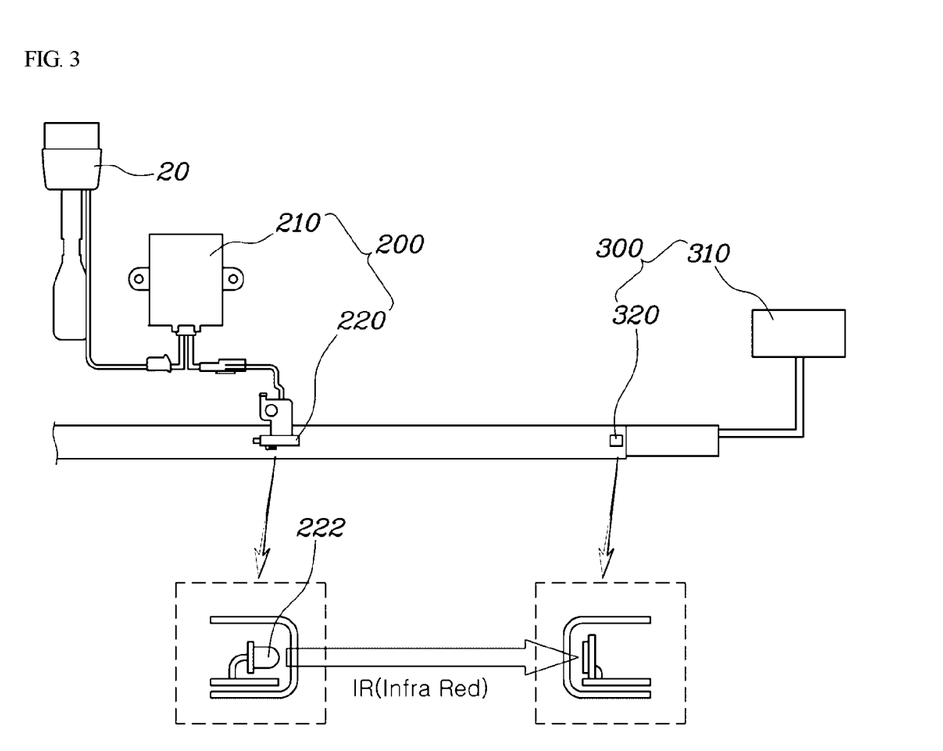
FIG. 3 is a diagram illustrating a configuration for wirelessly transmitting the seatbelt fastening signal through a sub transmission and reception unit and a main transmission and reception unit inside the tunnel member according to the present disclosure.

Referring to FIGS. 2 and 3, the sub-transmission and reception unit 200 may include the sub-controller 210 connected to the buckle 20, and may be configured to receive a signal indicating that the seatbelt 10 is fastened to the buckle 20; and the sub-sensor module 220 provided inside the tunnel member 100 may be configured to transmit the electromagnetic wave signal to the main transmission and reception unit 300 by receiving a signal transmitted by the sub-controller 210.

For example, the sub-controller 210 may be a sub-ECU, and may be individually mounted on each seat. For reference, the sub-controller 210 may be configured to supply a power source using a battery. Further, the sub-sensor module 220 may include an IR element as a transmission sensor 222 to emit the infrared light, and a main sensor module 320 to be described later may include a photodiode as a reception sensor to sense the infrared light emitted by the IR element. In other words, when the seatbelt 10 is fastened to the buckle 20, the buckle 20 fastening signal may be transferred from the sub-controller 210 to the sub-sensor module 220, and the infrared signal may be transferred from the sub-sensor module 220 to the main sensor module 320.

Figure 9:
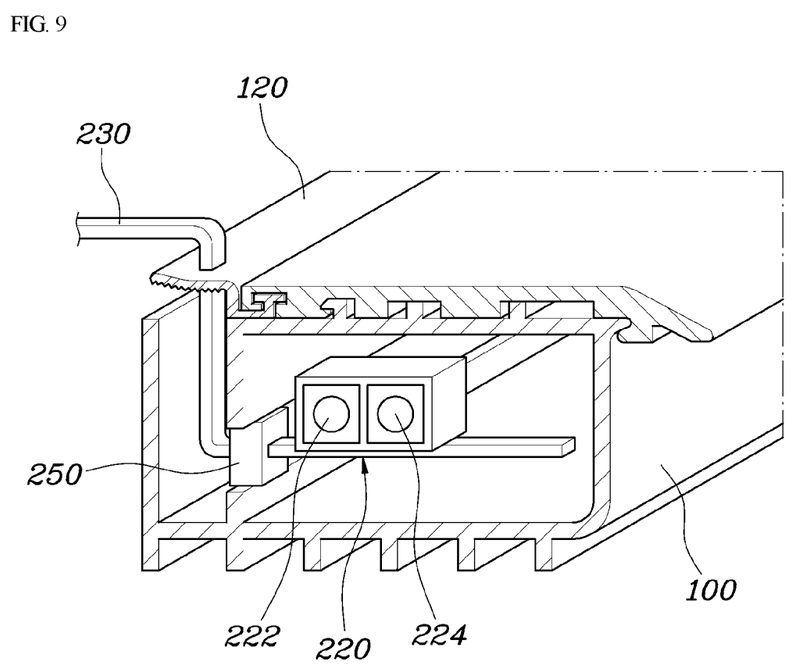
FIG. 9 is a view illustrating a cross-sectional structure in which a reflector is coupled to the inner surface of the tunnel member according to the present disclosure.

Referring to FIG. 9, the sub-sensor module 220 may include an IR element functioning as a reception sensor 224 other than the IR element functioning as the transmission sensor 222, such that a pair of IR elements for transmission and reception may be provided. Therefore, the infrared signal may be transmitted and received inside the tunnel member 100, and thus the present disclosure may receive the infrared signal transmitted by another sub-sensor module 220. Subsequently, the main transmission and reception unit 300 may include the main sensor module 320 and a main controller 310.

Referring to FIGS. 2 and 3, the main transmission and reception unit 300 may include the main sensor module 320 provided inside the tunnel member 100, and configured to receive the electromagnetic wave signal transmitted by the sub-transmission and reception unit 200; and the main controller 310 configured to receive the signal transmitted by the main sensor module 320 to transfer the signal to the integrated controller 400.

For example, the main sensor module 320 may be disposed on the edge of the tunnel member 100, and provided with a photodiode as a reception sensor to sense the infrared light emitted by the sub-sensor module 220. Further, the main controller 310 may be a main ECU, and mounted on a C filler of the vehicle. In other words, when the infrared signal transmitted by the sub-sensor module 220 is received in the main sensor module 320, the signal may be transferred from the main sensor module 320 to the main controller 310, and the main controller 310 may be interfaced with the ICU, which is the integrated controller 400 to output a wanting to the vehicle indicting the fastening state ofthe seatbelt 10.

Meanwhile, the tunnel member 100 according to the present disclosure may include the inner passage formed in a darkroom structure. In other words, if the foreign matters are introduced into the tunnel member 100, or other signals other than the infrared signal through the sensor module are introduced, the transmission and reception performance of the corresponding infrared signal may be reduced. Therefore, by darkening the inside of the tunnel member 100, it may be possible to prevent other signals other than the infrared signal from being introduced into the tunnel member 100, and to prevent other foreign matters from being introduced into the tunnel member 100, thereby improving the transmission and reception performance of the infrared signal.

Figure 4:
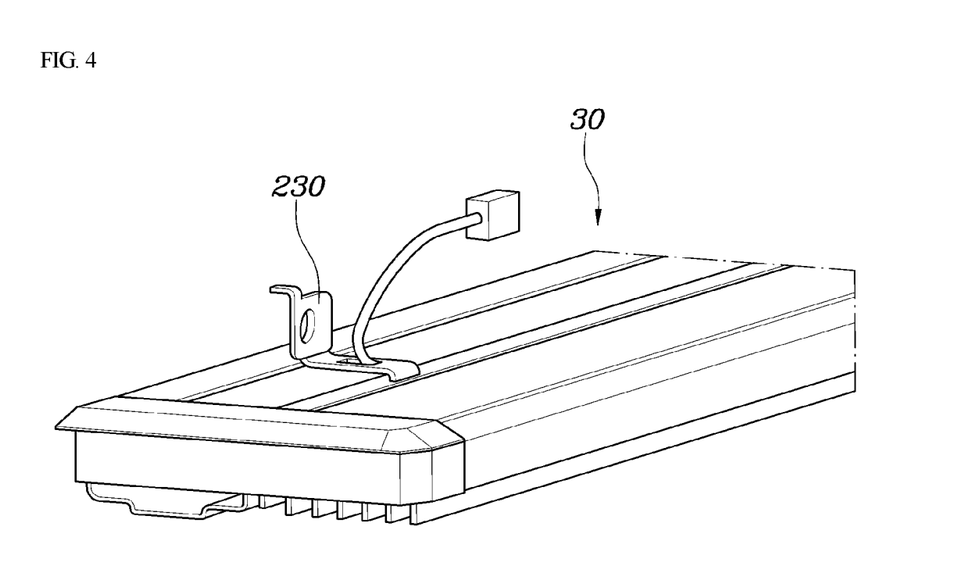
FIG. 4 is a view illustrating the sub-sensor module according to the present disclosure.
Figure 5:
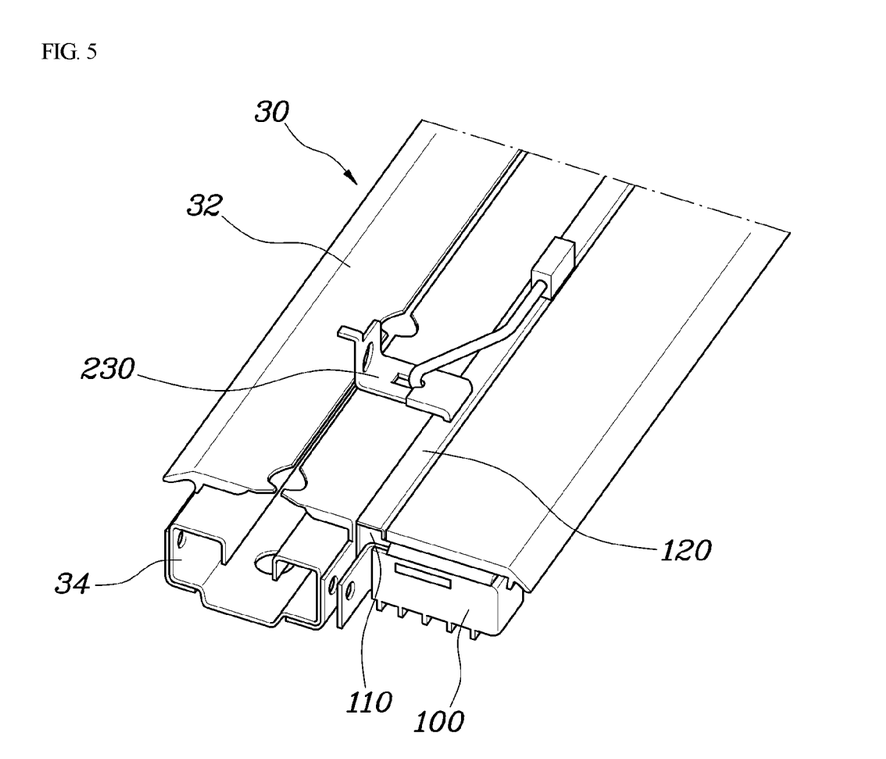
FIGS. 5 to 7 are diagrams illustrating a structure in which the sub-transmission and reception unit according to the present disclosure is coupled to a seat mil.
Figure 6:
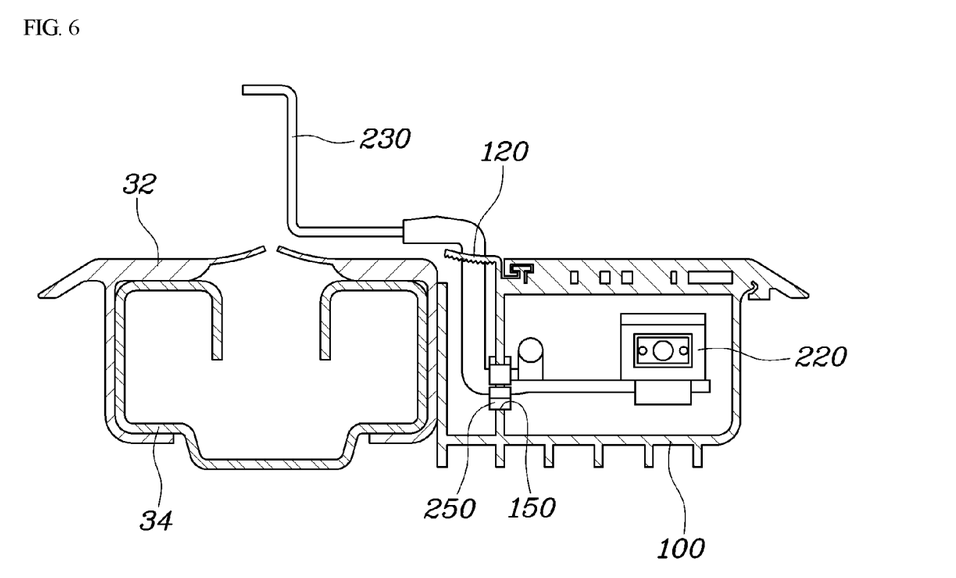
Figure 7:
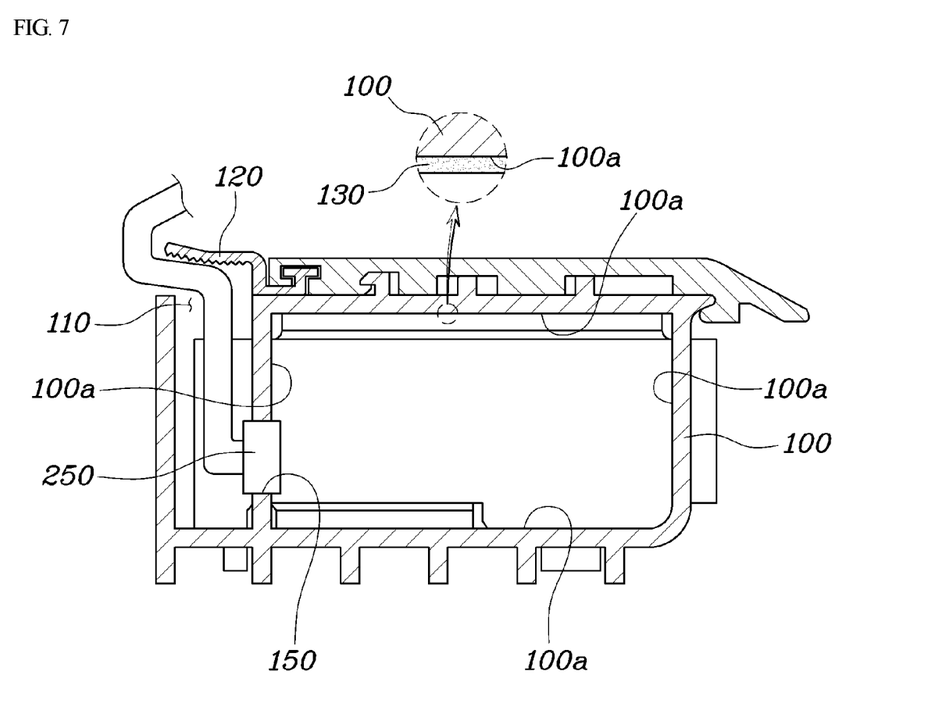

Further, FIGS. 4 to 6 are diagrams illustrating a structure in which the sub-transmission and reception unit 200 according to the present disclosure is coupled to the seat rail 30. Referring to FIGS. 5 to 7, a through slot 110 may be formed on the end of the tunnel member 100 in the longitudinal direction; the connecting portion between the sub-controller 210 and the sub-sensor module 220 penetrates the through slot 110 and the sub-sensor module 220 may be disposed inside the tunnel member 100; and a darkroom formation member 120 made of a flexible material in a shape covering the through slot 110 is coupled. In other words, the darkroom formation member 120 may maximally reduce the light within the tunnel member 100.

For example, the edges of the front and rear ends of the tunnel member 100 are formed in a closed shape, and the through slot 110 is formed back and forth on the side of the upper end of the tunnel member 100 proximate to the seat rail 30. In other words, the sub-controller 210 may be installed on the seat and provided outside the tunnel member 100, whereas the sub-sensor module 220 may be installed inside the tunnel member 100, to provide the sub-sensor module 220 inside the tunnel member 100, the connecting portion (e.g., wiring) between the sub-controller 210 and the sub-sensor module 220 is required to be provided through the through slot 110.

However, in this case, the through slot 110 may be opened and thus outside light may be introduced into the tunnel member 100, thereby preventing the light from being introduced into the tunnel member 100 by covering the darkroom formation member 120 on the through slot 110, and thus darkening the tunnel member 100 even while providing the sub-sensor module 220 inside the tunnel member 100. Further, the darkroom formation member 120 may be formed of a rubber or a brush having a thin rubber plate shape and coupled to the inner surface of the through slot 110.

In other words, when the movable rail 32 is moved, the connecting portion between the sub-controller 210 and the sub-sensor module 220 is moved together along the through slot 110, and the rubber or the brush area contacting the connecting portion in the moving process of the connecting portion may be flexibly deformed and then immediately restored, thereby stably implementing the darkening of the tunnel member 100 even while smoothly allowing the movement of the connecting portion. According to the present disclosure, the tunnel member 100 may be separately provided on the side surface of the seat rail 30. The inside of the tunnel member 100 may be additionally formed with a separate bracket structure to locate the sub-sensor module 220.

Referring to FIGS. 4 to 6, the tunnel member 100 may be fixed to a vehicle body on the side of the seat rail 30; a first end of a module fixing bracket 230 may be coupled to the movable mil 32 configuring the seat rail 30; a middle end of the module fixing bracket 230 may penetrate the through slot 110 and a second end of the module fixing bracket 230 may be coupled to the sub-sensor module 220; a guide slot 150 may be formed in an inner surface 100a of the tunnel member 100 connected to the through slot 110 in the longitudinal direction; and a guider 250 may be fixed to the middle end of the module fixing bracket 230, such that the guider 250 is slid along the guide slot 150. The middle end may be disposed between the first end and second end and the second end may be opposite to the first end.

Particularly, the connecting portion between the sub-controller 210 and the sub-sensor module 220 changes to a state of being locked to a part of the module fixing bracket 230 and coupled along the module fixing bracket 230. Therefore, when the movable rail 32 is moved, the module fixing bracket 230 is moved together with the connecting portion between the sub-controller 210 and the sub-sensor module 220, and particularly, the guider 250 may be slid along the guide slot 150 in the moving process of the module fixing bracket 230 to stably guide the movement of the sub-sensor module 220.

Meanwhile, according to the present disclosure, the inner surface 100a of the tunnel member 100 may be formed in a relatively bright white-series color. In other words, it may be possible to adopt the bright color-series color advantageous for light reflection as the color of the inner surface 100a of the tunnel member 100, thereby improving the transmission and reception performance of the infrared signal.

Further, FIG. 7 is a view illustrating a painting layer 130 together with the cross-sectional structure of the tunnel member 100, and referring to FIG. 7, the painting layer 130 may be formed on the inner surface 100a of the tunnel member 100. In other words, the painting layer 130 may be applied to the inner surface 100a of the tunnel member 100 to improve the transmission and reception performance and reception rate of the infrared signal.

Figure 8:
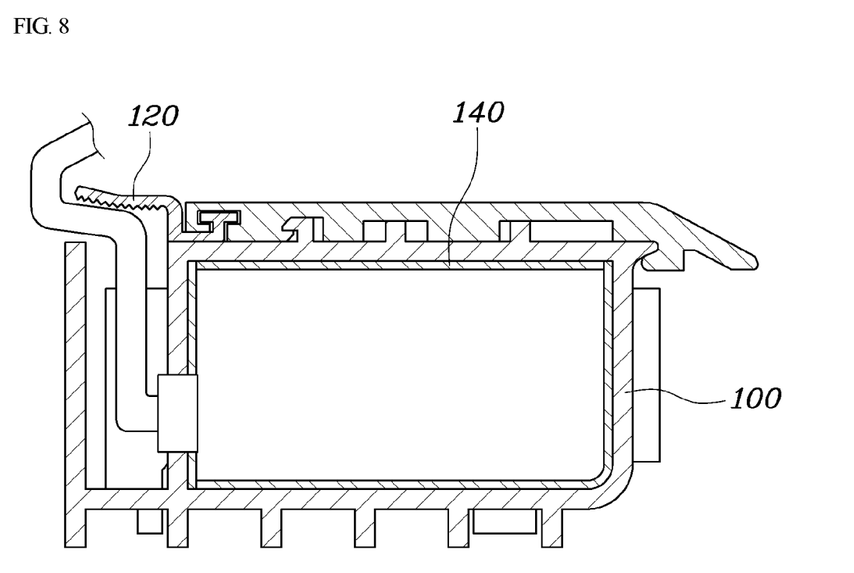
FIG. 8 is a view illustrating a painting layer together with a cross-sectional structure of the tunnel member according to the present disclosure.

Further, FIG. 8 is a view illustrating the cross-sectional structure in which a reflector 140 is coupled to the inner surface 100a of the tunnel member 100 according to the present disclosure, and referring to FIG. 8, the reflector 140 may be formed on the inner surface 100a of the tunnel member 100. In other words, the reflector 140 may be applied to the inner surface 100a of the tunnel member 100 to improve the transmission and reception performance and reception rate of the infrared signal.

For reference, the location and shape of the reflector 140 may be deformed according to the shape of the tunnel member 100, and as the shape of the tunnel member 100, various shapes such as a straight line, a curve, a circle, and an oval may be adopted, and further, as the cross-sectional shape of the tunnel member 100, various shapes including a rectangle, a circle, and a triangle may also be adopted.

Figure 10:
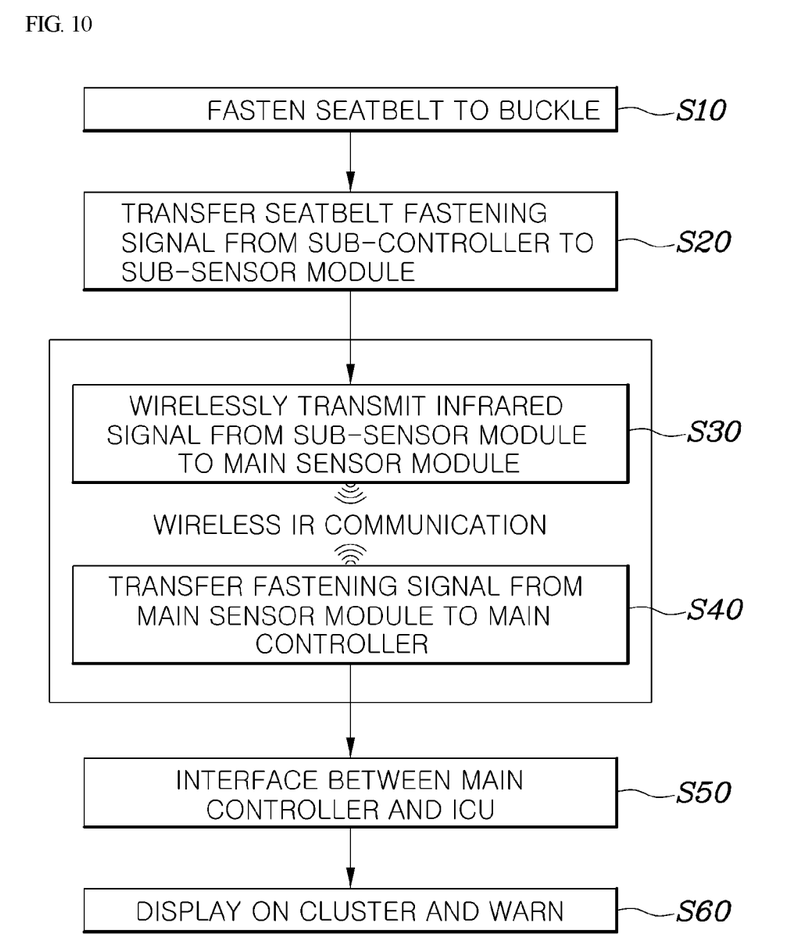
FIG. 10 is a block diagram illustrating a process of transferring the seatbelt fastening signal according to the present disclosure.

FIG. 10 is a block diagram illustrating a process of transferring the seatbelt 10 fastening signal according to the present disclosure. Therefore, referring to FIGS. 2 and 10, describing the process of determining whether the seatbelt 10 is wirelessly fastened, when the seatbelt 10 is fastened to the buckle 20 (S1O), the sub-controller 210 may be configured to sense the fastening to transfer the seatbelt 10 fastening signal from the sub-controller 210 to the sub-sensor module 220 (S20).

Subsequently, as the transmission sensor 222 of the sub-sensor module 220 emits the infrared signal, the reception sensor of the main sensor module 320 may be configured to receive the emitted infrared signal (S30). Then, the main sensor module 320 may be configured to transfer the fastening signal to the main controller 310 (S40). Therefore, the main controller 310 and the ICU are interfaced (S50), and the ICU may be configured to display the fastening state of the corresponding seatbelt 10 on the cluster 500 or output the warning of the fastening state by sound (S60).

As described above, according to the present disclosure, when the seatbelt 10 is fastened to the buckle 20, the sub-transmission and reception unit 200 may be configured to transmit the electromagnetic wave signal inside the tunnel member 100 in the longitudinal direction of the passage, and the main transmission and reception unit 300 may be configured to sense the electromagnetic wave signal inside the tunnel member 100, thereby securing the straightness of the electromagnetic wave signal regardless of the location of the seat, other obstacles, or the like. Therefore, by improving the wireless transmission and reception performance of the electromagnetic wave signal according to the fastening of the buckle 20, it may be possible to more accurately sense whether the seatbelt 10 is worn, thereby improving the merchantability of the product.

For reference, the controller according to the exemplary embodiment of the present disclosure may be implemented by a non-volatile memory (not illustrated) configured to store an algorithm configured to execute the operations of various components of the vehicle or data relating to software instructions reproducing the algorithm and a processor (not illustrated) configured to perform an operation described below using the data stored in the corresponding memory. In particular, the memory and the processor may be implemented by an individual chip. Alternatively, the memory and the processor may be implemented by a single chip integrated to each other. The processor may have the form of one or more processors.

Meanwhile, while only the specific exemplary embodiment of the present disclosure has been illustrated in detail, it will be apparent to those skilled in the art that the present disclosure may be variously modified and changed without departing from the technical spirit of the present disclosure, and it is natural that the modifications and changes fall within the scope of the appended claims.

What is claimed is:

1. A wireless seatbelt reminder device, comprising:
   a tunnel member disposed in parallel to a seat rail, and having a passage formed therein, wherein a through slot is formed in an end of the tunnel member in the longitudinal direction;
   a sub-transmission and reception unit configured to transmit an electromagnetic wave signal in the longitudinal direction of the passage in response to a seatbelt being fastened to a buckle; and
   a main transmission and reception unit configured to receive the electromagnetic wave signal transmitted by the sub-transmission and reception unit inside the passage to transfer the electromagnetic wave signal to an integrated controller wherein a first end of a module fixing bracket is coupled to the seat rail,
wherein a middle end of the module fixing bracket penetrates the through slot,
wherein a guide slot is formed on an inner surface of the tunnel member connected to the through slot in the longitudinal direction, and
wherein the module fixing bracket is slid along the guide slot.

2. The wireless seatbelt reminder device according to claim 1, wherein the sub-transmission and reception unit includes:
a sub-controller connected to the buckle, and configured to receive a signal indicating that the seatbelt is fastened to the buckle; and
a sub-sensor module provided inside the tunnel member, and configured to transmit the electromagnetic wave signal to the main transmission and reception unit by receiving the signal transmitted by the sub-controller.

3. The wireless seatbelt reminder device according to claim 1, wherein the main transmission and reception unit includes:
a main sensor module provided inside the tunnel member, and configured to receive the electromagnetic wave signal transmitted by the sub-transmission and reception unit; and
a main controller configured to receive the signal transmitted by the main sensor module to transfer the signal to the integrated controller.

4. The wireless seatbelt reminder device according to claim 1, wherein the tunnel member has an inner passage formed in a darkroom structure.

5. The wireless seatbelt reminder device according to claim 2,
wherein the connecting portion disposed between the sub-controller and the sub-sensor module penetrates the through slot, and the sub-sensor module is provided inside the tunnel member, and
wherein a darkroom formation member of the darkroom structure is made of a flexible material in a shape covering the through slot.

6. The wireless seatbelt reminder device according to claim 5, wherein the darkroom formation member is composed of a rubber or a brush having a shape of a thin rubber plate and coupled to the inner surface of the through slot.

7. The wireless seatbelt reminder device according to claim 5, wherein the tunnel member is provided separately on a side surface of the seat rail.

8. The wireless seatbelt reminder device according to claim 5,
wherein the tunnel member is fixed to a vehicle body on a side of the seat rail,
wherein the first end of the module fixing bracket is coupled to a movable rail configuring the seat rail,
wherein a second end of the module fixing bracket is coupled to the sub-sensor module,
and
wherein a guider is fixed to the middle end of the module fixing bracket, and the guider is slid along the guide slot.

9. The wireless seatbelt reminder device according to claim 1, wherein an inner surface of the tunnel member is formed in a relatively bright white-series color.

10. The wireless seatbelt reminder device according to claim 1 wherein a painting layer is formed on an inner surface of the tunnel member.

11. The wireless seatbelt reminder device according to claim 1, wherein a reflector is formed on an inner surface of the tunnel member.

* * * * *